United States Patent [19]
Willock

[11] 3,785,831
[45] Jan. 15, 1974

[54] WHIPPABLE COMPOSITION
[75] Inventor: James Taylor Willock, Middle Barton, England
[73] Assignee: General Foods Limited, White Plains, N.Y.
[22] Filed: Jan. 5, 1972
[21] Appl. No.: 215,637

[52] U.S. Cl. .................................................. 99/139
[51] Int. Cl. ............................................ A23g 3/00
[58] Field of Search ...................................... 99/139

[56] References Cited
UNITED STATES PATENTS
3,251,696 5/1966 Miles et al. ........................... 99/139
3,423,211 1/1969 Miles et al. ........................... 99/139
3,479,190 11/1969 Ganz .................................... 99/139

*Primary Examiner*—A. Louis Monacell
*Assistant Examiner*—J. M. Hunter
*Attorney*—Bruno P. Struzzi

[57] ABSTRACT

A whippable topping composition having improved low temperature performance is prepared utilizing a mixture containing at least two emulsifiers, a primary and a secondary emulsifier. The primary emulsifier is a lactylated glycerol ester, and the secondary emulsifier is a partial or complete ester of a common food acid and a mono and/or diglyceride of a saturated or unsaturated fat forming $C_{12} - C_{22}$ fatty acid.

4 Claims, 1 Drawing Figure

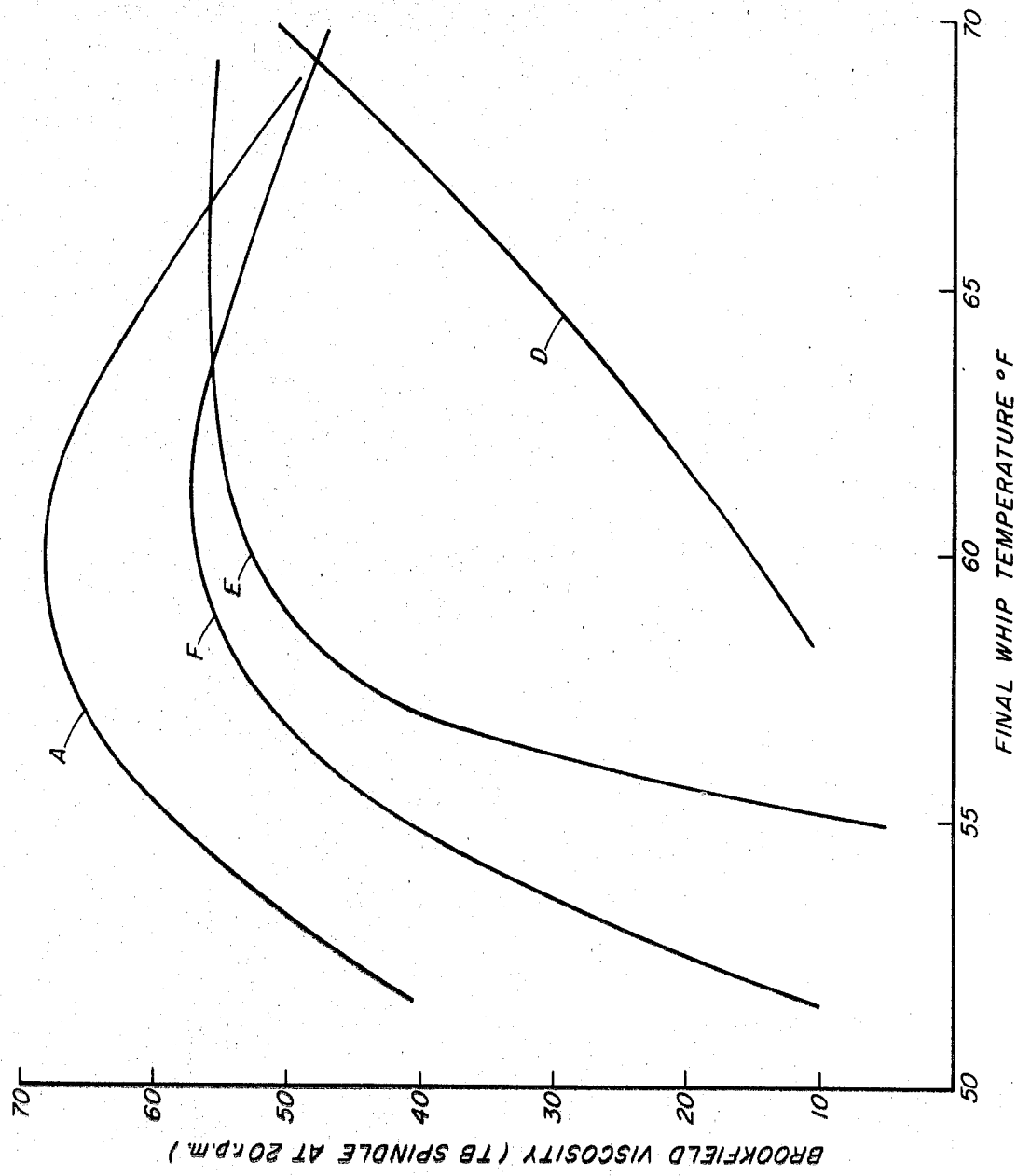

WHIPPABLE COMPOSITION

BACKGROUND OF THE INVENTION

This invention relates to whippable compositions. More particularly, the invention is concerned with powdered, free-flowing whippable compositions in the form of dried emulsions containing fat, protein, carbohydrates and emulsifiers.

Compositions adapted for the preparation of whipped toppings have now been known for a number of years and such compositions are generally in the form of dried emulsions which are conventionally prepared by drying emulsions of fat and edible water-soluble components, for example by spray-drying or freeze-drying, to provide a powdered, free-flowing fat composition. When these dried emulsions are employed in the preparation of whipped toppings it is desirable that the resulting product is characterized by a high degree of over-run, acceptable viscosity and mouth-feel and freedom from churn-out of the fat.

Conventional ingredients for the dried emulsions include fat, protein, carbohydrate and an emulsifier. Examples of whippable compositions are those described and claimed in British Pat. Specification Nos. 1113462, 1140937, 1091270, and 1019147.

One of the disadvantages of prior whippable compositions as typified by those disclosed in the above-mentioned specifications is that, when subjected to conditions wherein the temperature of the mixture containing the composition and liquid prior to whipping is below about 50°F. (10°C.) and in some cases below about 60°F. (15.6°C.), the resulting whipped product does not possess an acceptable overrun and viscosity or the composition may even fail to whip. These conditions may arise from the low temperature of the powdered composition itself, of the milk or water which is used to make up the topping, of the mixing bowl, or of the beater or other whisking implement, or combinations of any of these. When a prior art powder has been subjected to very cold conditions, e.g., around 32°F. (0°C.), it requires to be heated to above 70°F. (21.1°C.) before it recovers its whipping properties. Failure of products of this type to whip satisfactorily can and does occur during winter, probably due to a combination of the low temperatures of the powder and milk.

SUMMARY OF THE INVENTION

It has now been found that whippable compositions having improved low temperature performance without any impairment of their organoleptic and performance characteristics may be obtained by the utilization, as the emulsifier component, of a particular mixture of at least two emulsifiers which are designated herein as the primary emulsifier and the secondary emulsifier and wherein the primary emulsifier is a lactylated glycerol ester, and the secondary emulsifier comprises a partial or complete ester of a common food acid and a mono-and/or diglyceride of a saturated or unsaturated fat forming $C_{12}$–$C_{22}$ fatty acid. The preferred secondary emulsifier being an acetylated monoglyceride. The low temperature tolerance exhibited by the combination of the primary and secondary emulsifier described above is not exhibited by either the primary or secondary emulsifier when used independently in topping compositions, but appears to be dependent on some synergistic effect of these two emulsifiers in the proportions specified.

In accordance with the present invention there is provided a powdered, free-flowing, whippable composition having improved low temperature tolerance in the form of a dried emulsion containing fat, protein and carbohydrate and which includes, as a primary emulsifier, a lactylated glycerol ester and, as a secondary emulsifier, a partial or complete ester of a common food acid, as hereinafter defined, and a mono-and/or diglyceride of a saturated or unsaturated fat-forming $C_{12}$–$C_{22}$ fatty acid, the primary emulsifier and secondary emulsifier being present in a total amount of up to 20 percent by weight of the dry solids and in a ratio from 5:1 to 1:1.

DESCRIPTION OF THE PREFERRED EMBODIMENT

The lactylated glycerol ester used as the primary emulsifier in the composition of the present invention is a partial or complete ester of lactic acid and a mono- or diglyceride of a saturated or unsaturated fat-forming $C_{12}$–$C_{22}$ fatty acid. One of the preferred primary emulsifiers is a glycerol lactopalmitate (GLP) which has been refined after esterification so that it comprises 92 percent by weight or more of the mixture of glycerol monopalmitate, glycerol di-palmitate, mono-lactylated glycerol mono-palmitate, mono-lactylated glycerol di-palmitate, di-lactylated glycerol mono-palmitate and tri-lactylated glycerol mono-palmitate, and less than 8 percent of homologous esters of stearic acid. Examples of glycerol lactopalmitate emulsifiers are those sold under the Trade name, "Whippidan" GLP419 and "Whippidan" GLP911 manufactured by Grinstedvaerket, Denmark and which conform to the following specification:

Acid value — 2 – 3
Saponification value — about 260
Iodine value — 1.5 max.
Lactic acid content — 13–15 percent
Water soluble material nil
Composition by weight of fatty acids:
$C_{12}$ — 2 percent max.
$C_{14}$ — 2 percent max.
$C_{16}$ — 93 percent min.
$C_{18}$ — 5 percent max.
$C_{20}$ — -

The difference between GLP 419 and GLP 911 is that GLP 911 has a higher content of diglycerides and lactylated diglycerides than GLP 419, and GLP 419 has a higher content of lactylated mono-glycerides than GLP 911.

The "common food acid" used in the secondary emulsifier is defined so as to include acetic, citric, tartaric, malic or fumaric acid. Representative examples of the secondary emulsifier are the acetic, citric, tartaric or diacetyl tartaric acid esters of a mono-and/or di-glyceride, such as glyceryl monostearate (GMS).

Preferred secondary emulsifiers are acetylated monoglycerides (AMG) such as those sold under the Trade Names of 'Myvacet' (Eastman Kodak), Aceto-glyceride 55H (Wilson-Martin) and 'Cetodan' (Grindstedvaerket). A typical specification range for AMG is given below:

Melting point °C. — 30–42
Degree of acetylation — 0.5 – 0.9
Acid value (maximum) — 2

Saponification value — 280-370
Composition of fatty acids:
Myriatic and lower max. — 5 percent
Palmitic (approx.) — 30 percent
Stearic (approx.) — 65 percent
Arachidic and higher max. — 5 percent The emulsifiers are used in proportions of 1 part secondary emulsifier to 1 to 5 parts by weight of the primary emulsifier up to a total of about 20 percent by weight of the combined emulsifier in the dry composition. A ratio of 1:2 by weight, is preferred.

The present invention also provides a process for preparing a powdered, free-flowing, whippable composition having low temperature tolerance which comprises dispersing a formulation containing fat, protein, carbohydrate and a mixture of a primary emulsifier and a secondary emulsifier as herein described, in an aqueous medium and drying the resulting emulsion, preferably by spray-drying.

The dry compositions of the present invention exhibit improved properties over prior art compositions particularly in tolerance to low temperature conditions and will produce a satisfactory whip under the extreme conditions of normal domestic usage. The desirable tolerance to high temperature make up conditions has been retained and the composition also exhibits good whipping characteristics over a range of powder to milk ratios and with a range of whipping implements giving various rates of shear.

The improved characteristics of the composition of this invention are illustrated by the following examples.

Unless indicated all parts and percentages are by weight.

EXAMPLE 1

A composition containing GLP and AMG in the ratio of 2:1 was made up from the following ingredients:

|  | Composition A % |
|---|---|
| Hydrogenated Palm Kernel Oil (HPKO) | 48 |
| GLP (911) | 8 |
| AMG (Cetodan 70) | 4 |
| Sodium Caseinate | 10 |
| Lactose | 10 |
| Sugar | 20 |
|  | 100% |

The composition was made up as an emulsion and spray dried. The resulting particulate free flowing powder is preferably cooled immediately to below 50°F and thereafter stored at room temperature.

In order to demonstrate the temperature tolerance of the composition a series of tests were carried out using a standard set of make up utensils and a number of combinations of powder, milk and bowl temperatures.

50g samples of powder were packed in foil laminate packets and held for various periods of time in the freezing compartment of a domestic refrigerator.

The milk temperatures were controlled by immersing containers of 150 ml. milk in a water bath, and because of the high thermal capacity of the mixing bowls and utensils these temperatures were also regulated by immersing the bowls in a water bath at a definite temperature (70°F. or 45°F.) and drying before use.

Tests carried out under controlled conditions, using a four-minute whip on a conventional electric mixer, and the various combinations of temperatures produced by the methods described above gave the following results:

| Sample Number | 1 | 2 | 3 | 4 | 5 |
|---|---|---|---|---|---|
| Powder Temperature (°F.) | 70 | 57 | 47 | 25 | 20 |
| Bowl Temperature (°F.) | 70 | 45 | 45 | 45 | 45 |
| Milk Temperature (°F.) | 35 | 47 | 45 | 45 | 35 |
| °Final Whip Temp. (°F.) | 66½ | 58 | 56½ | 52 | 51 |
| *Overrun (%) | 293 | 268 | 262 | 233 | 106 |
| +Viscosity (Brookfield units) | 70 | 56 | 53 | 45 | 19 |

° Temperature after whipping.
* Overrun % Weight of Xml slurry - weight of Xml Whipped Product × 100 Weight of Xml product where specific gravity of slurry is taken as 1.0 + Viscosity of whip measured in Brookfield units using Brookfield Viscometer Model HAT at 20 r.p.m. with a TB Spindle on a helipath.

Subjective taste panel results showed that composition A had organoleptic properties which compared favourably with prior art formulations.

EXAMPLE 2

A further series of tests on a composition made up according to the formulation in Example 1 and carried out under the same conditions as those described in Example 1 gave the following results.

| Sample Number | 6 | 7 | 8 | 9 | 10 |
|---|---|---|---|---|---|
| Bowl Temperature (°F.) | 45 | 70 | 70 |  | 70 |
| Powder Temperature (°F.) | 36 | 25 | 30 |  | 33 48 |
| Milk Temperature (°F.) | 33 | 33 | 34 |  | 33 35 |
| Final Whip Temperature (°F.) | 50 | 54 | 55 |  | 57 58 |
| Overrun (%) | 159 | 159 | 230 |  | 268 27 |
| Viscosity (Brookfield Unit) | 11 | 20 | 37 |  | 57 59 |

Tests were also carried out to demonstrate the tolerance in variation in the powder to milk ratio:

| Powder Weight (g) | Milk Vol (ml) | Powder Temp (°F.) | Milk Temp (°F.) | Whip Time (Min.) | Overrun % | Viscosity B.U. |
|---|---|---|---|---|---|---|
| 50 | 114 | 65 | 45 | 3 | 264 | 95 |
| 50 | 150 | 65 | 45 | 3 | 300 | 58 |
| 50 | 250 | 65 | 45 | 3 | 330 | 27 |

Fork whipping was carried out under the following conditions: Powder 70°F., Bowls 70°F., Milk 45°F.

The mixture was whipped by hand using a domestic fork until soft peaks could be formed from the whip. Results of this test were:

Whip time for 50g powder in 114 ml. milk - 1–1 1/2 minutes

Whip time for 50g powder in 150 ml. milk - 1 1/2 – 2 minutes

EXAMPLE 3

COMPARATIVE EXAMPLES

Other whipping compositions were made up according to the following formulations:

|  | Composition B | Composition C | Composition D |
|---|---|---|---|
| HPKO | 48 | 48 | 44 |
| GLP | 12 | — | — |
| AMG | — | 12 | — |
| Propylene glycol monostearate (PGMS) | — | — | 15 |
| Sodium Caseinate | 10 | 10 | 7 |
| Lactose | 10 | 10 | 7 |
| Whey Solids | — | — | 3 |
| Sucrose | 20 | 20 | 23 |
| Lecithin | — | — | 1 |
|  | 100 | 100 | 100 |

Compositions B and C were essentially the same as Composition A except that GLP and AMG were used independently and not in combination. Composition D is based on prior art PGMS formulation such as that disclosed in British Pat. Specification No. 1,113,462. All compositions were processed in a similar manner to Composition A.

Temperature tolerance tests were performed on samples of Compositions B, C, and D in a similar manner to those described in Example 1. Results were:

| Composition B Sample Number | 1 | 2 | 3 | 4 | 5 |
|---|---|---|---|---|---|
| Powder Temperature (°F.) | 70 | 70 | 70 | 70 | 70 |
| Bowl Temperature (°F.) | 70 | 45 | 50 | 50 | 50 |
| Milk Temperature (°F.) | 47 | 47 | 38 | 37 | 35 |
| Final Whip Temperature (°F.) | 66 | 58 | 57 | 56 | 55 |
| Overrun (%) | 268 | 225 | 177 | 115 | 97 |
| Viscosity (B.U.) | 63 | 64 | 52 | 16 | 5 |

| Composition C Sample Number | 1 | 2 | 3 | 4 | 5 |
|---|---|---|---|---|---|
| Power Temperature (°F.) | 70 | 70 | 70 | 55 | 31 |
| Bowl Temperature (°F.) | 70 | 45 | 45 | 45 | 70 |
| Milk Temperature (°F.) | 47 | 45 | 35 | 45 | 45 |
| Final Whip Temperature (°F.) | 67 | 58 | 54 | 57 | 59 |
| Overrun % | 214 | 142 | 138 | 142 | 61 |
| Viscosity (B.U.) | 40 | 7 | 9 | 10 | 3 |

| Composition D Sample Number | 1 | 2 | 3 | 4 | 5 |
|---|---|---|---|---|---|
| Powder Temperature (°F.) | 73 | 73 | 50 | 50 | 50 |
| Bowl Temperature (°F.) | 70 | 70 | 45 | 45 | 45 |
| Milk Temperature (°F.) | 45 | 35 | 70 | 45 | 35 |
| Final Whip Temperature (°F.) | 68 | 65 | 63 | 57 | 54 |
| Overrun % | 198 | 218 | 218 | 146 | 126 |
| Viscosity (B.U.) | 65 | 71 | 27 | 8 | 5 |

Fork whip tests carried out in the same manner as Example 2 showed that the time required to produce a whip which retained soft peaks was:

|  | 50g powder in 114 ml. milk | 50g. powder in 150 ml. milk |
|---|---|---|
| Composition B | 4–5 mins. | * |
| Composition C | 5–6 mins. | * |
| Composition D | 2–3 mins. | 7–8 mins. |

*In the case of compositions B and C the time taken to fork whip at the lower dilution was rather long and no attempt was made to fork whip at the higher dilution of 50g. powder to 150 ml. milk.

EXAMPLE 4

Samples of spray dried topping were prepared according to the following formulations.

|  | Composition E | Composition F |
|---|---|---|
| HPKO | 48 | 48 |
| GLP (911) | 10 | 6 |
| AMG (Cetodan 70) | 2 | 6 |
| Lactose | 10 | 10 |
| Sodium Caseinate | 10 | 10 |
| Sugar | 20 | 20 |
|  | 100 | 100 |

50g of powder from each of the samples was added to 150 ml. of milk and the mixture whipped for 4 minutes. The tests were carried out under varying temperature conditions by the method previously described in Example 1.

For comparative purposes compositions A and D were also included in this series of tests. The results obtained are illustrated in FIG. 1 which is a graph of the Brookfield viscosity against whip temperature for Compositions A, E and F and comparative prior art Composition D. The graph clearly shows the improved low temperature performance of the composition of the invention over the prior art composition.

What is claimed is:

1. A powdered, free-flowing, whippable composition having improved low temperature tolerance comprising a dried emulsion containing fat, protein, carbohydrate, a primary emulsifier and a secondary emulsifier; said primary emulsifier being glycerol lacto-palmitate; said secondary emulsifier being acetylated glycerol mono-stearate; the primary and secondary emulsifiers being present in a total amount not exceeding about 20 percent by weight of the dry solids and the weight ratio of primary to secondary emulsifier is about 5:1 to 1:1.

2. The product of claim 1 wherein the ratio of primary emulsifier to secondary emulsifier is about 2:1.

3. A process for preparing a powdered, free-flowing, whippable composition having improved low temperature tolerance which comprises dispersing a mixture in an aqueous medium to obtain an emulsion and drying the resulting emulsion; said mixture containing fat, protein, carbohydrate, a primary emulsifier and a secondary emulsifier; said primary emulsifier being glycerol lacto-palmitate; said secondary emulsifier being acetylated glycerol mono-stearate; the primary and secondary emulsifiers being present in a total amount not exceeding about 20 percent by weight of the dry solids and the weight ratio of primary to secondary emulsifier is about 5:1 to 1:1.

4. The process of claim 3 wherein the emulsion is spray dried.

* * * * *